United States Patent [19]

George et al.

[11] Patent Number: 4,944,108
[45] Date of Patent: Jul. 31, 1990

[54] SYSTEM FOR HARVESTING CRUSTACEANS

[75] Inventors: Albert L. George, Lafayette; Don Gooch, Erath, both of La.

[73] Assignee: Crawfish Technology of South Carolina, Inc., Columbia, S.C.

[21] Appl. No.: 222,718

[22] Filed: Jul. 21, 1988

Related U.S. Application Data

[63] Continuation-in-part of Ser. No. 5,590, Jan. 21, 1987, Pat. No. 4,798,020.

[51] Int. Cl.$^5$ ............................................. A01K 81/04
[52] U.S. Cl. ..................................... 43/6.5; 209/235; 209/420
[58] Field of Search ................ 43/4, 4.5, 6.5, 26.1; 37/55, 119; 56/8, 9; 119/2; 209/235, 272, 307, 420, 421, 633, 674, 935; 198/697

[56] References Cited

U.S. PATENT DOCUMENTS

| | | | |
|---|---|---|---|
| 1,099,407 | 6/1914 | Swayger | 209/633 |
| 1,486,485 | 3/1924 | Frissell | 43/6.5 |
| 1,960,857 | 5/1934 | Stoltenberg | 209/935 |
| 2,728,455 | 12/1955 | Greiner | 209/674 |
| 2,809,742 | 10/1957 | Holz | 198/697 |
| 2,828,012 | 3/1958 | Komuchar | 209/935 |
| 2,837,209 | 6/1958 | Forbes | 209/935 |
| 3,856,678 | 12/1974 | Hagihara | 198/697 |
| 4,187,946 | 2/1980 | Stevenson | 209/935 |
| 4,258,534 | 3/1981 | Bryant | 56/9 |
| 4,663,879 | 5/1987 | Bergeron, Jr. | 43/6.5 |
| 4,798,020 | 1/1989 | George et al. | 43/6.5 |

Primary Examiner—Kurt Rowan

[57] ABSTRACT

A primary vessel, such as a flotable float or the like, having a crustacean retrieving means attached to the forward end of the vessel, with the vessel being motor driven, the motor driving a plurality of dasic wheels to maintain the vessel above the water, and allowing it to move on the bottom of the pond. The retrieving means includes a first primary roller positioned substantially the distance of the width of the vessel and moving along the bottom of the pond for distrubing the crustaceans as the vessel moves forward. There is provided the primary conveyor wall directly to the rear of the primary roller wherein the crustaceans moving over the roller are deposited on the conveyor which transports the crustacean upward into a first receiving bin in the vessel. The primary conveyor includes a puralilty of spaced apart shelf members along its width so that the crustaceans will be lodged against the shelf member and will be deposited into the receiving bin as the conveyor belt circulates. In the upper most end of the conveyor belt, there is provided a grass catching means, which includes a surface wherein the grass is lodged thereupon, and deposited back into the pond. To the deposit bin there is included a coontinuous conveyor for transporting the crustaceans from the deposit bin to the rear of the vessel wherein the crawfish are sorted and boxed.

15 Claims, 4 Drawing Sheets

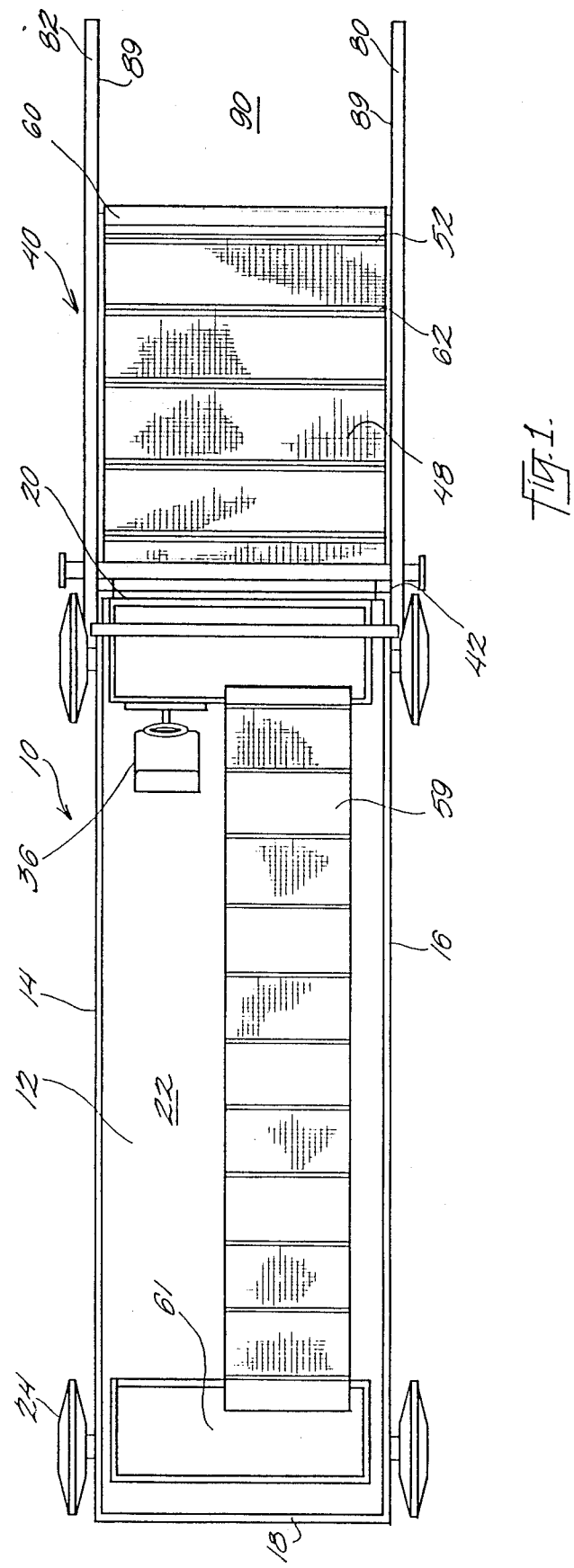

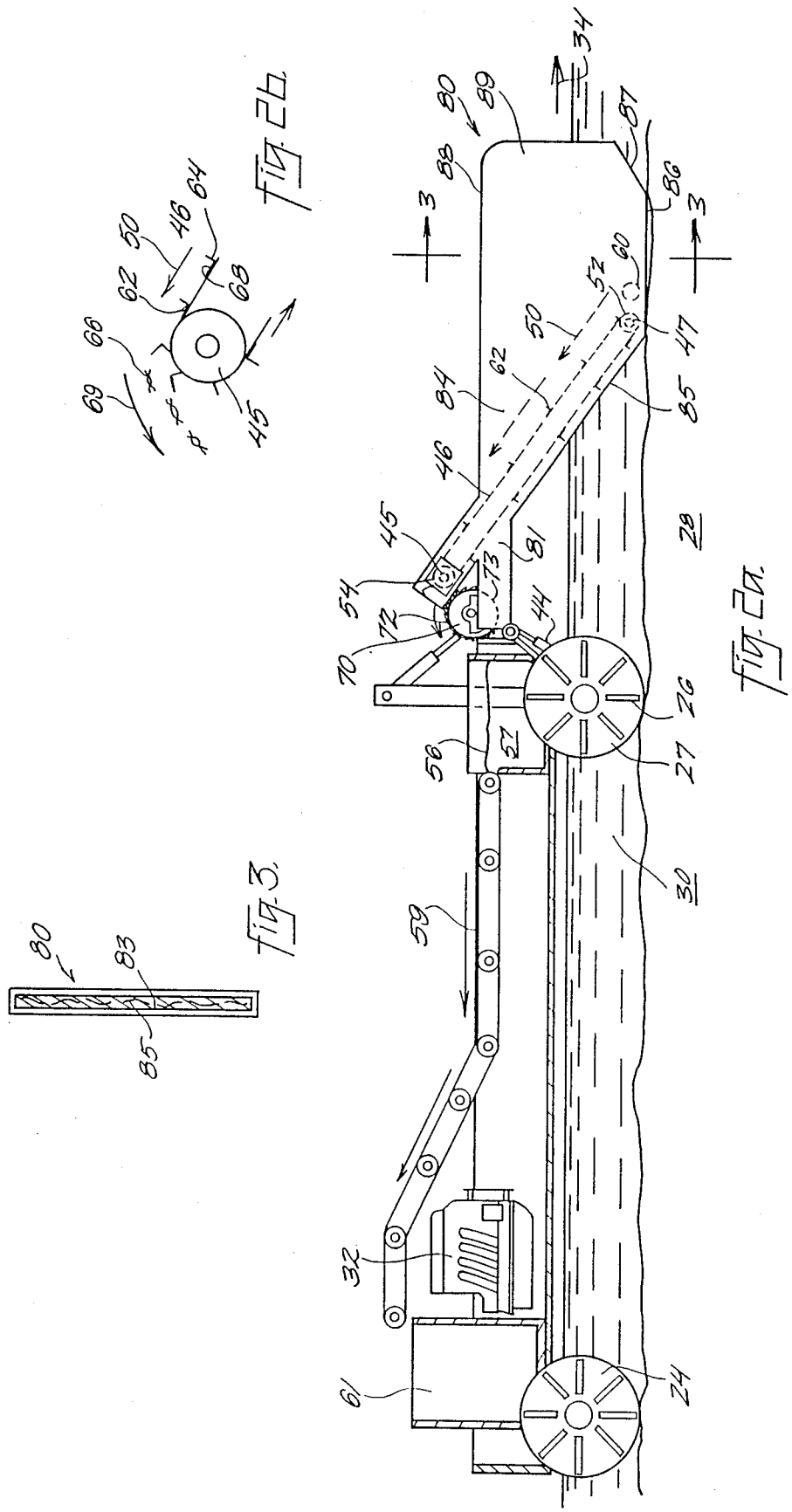

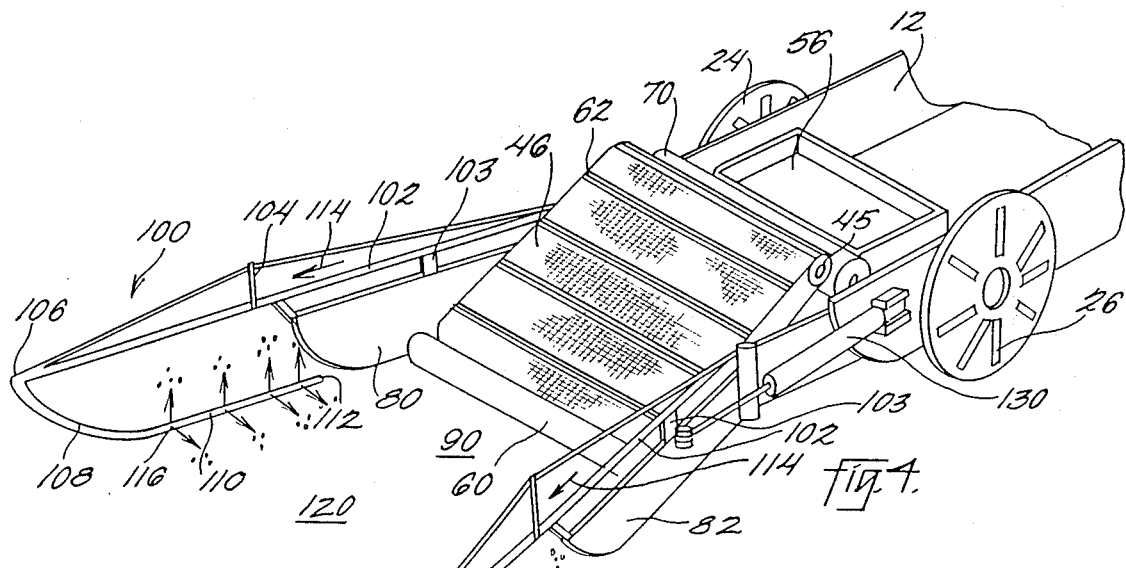
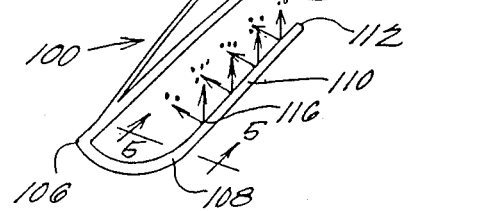
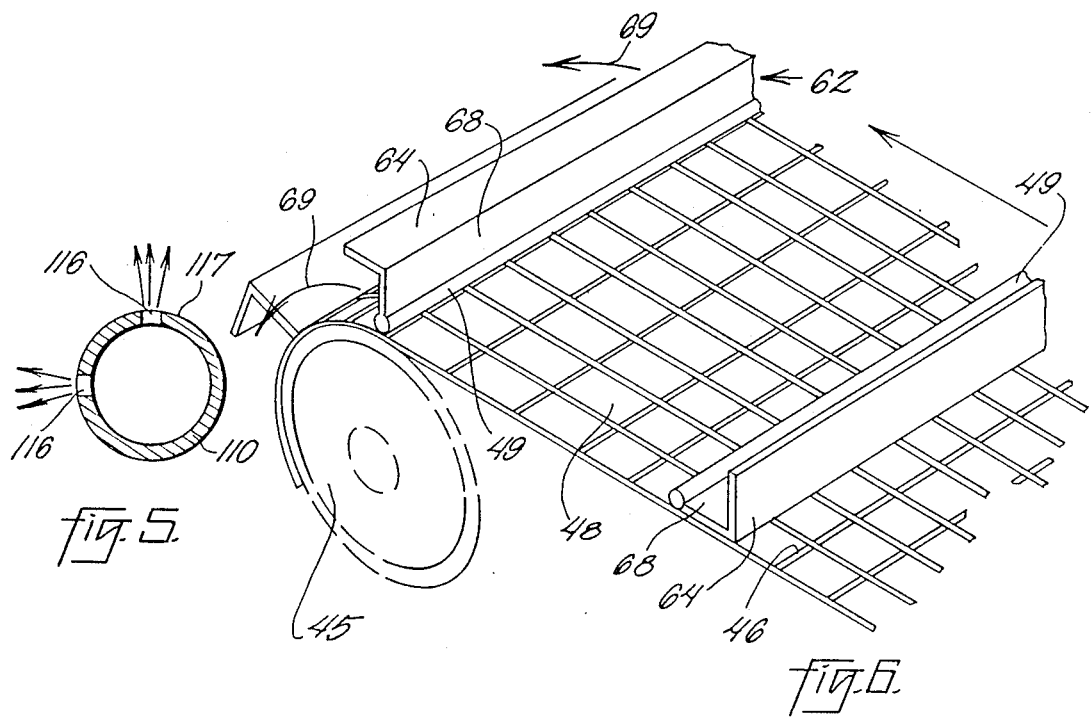

SYSTEM FOR HARVESTING CRUSTACEANS

This is a continuation-in-part of application bearing U.S. Ser. No. 005,590, filed Jan. 21, 1987, by the same inventors now U.S. Pat. No. 4,798,020.

BACKGROUND OF THE INVENTION

1. Field of the Invention

The present invention relates to the harvest of aquatic organisms such as crustaceans, and more particularly, the present invention relates to a system for "achieving baitless" harvesting of crustaceans through the use of a moveable collection device wherein the crustaceans are dislodged from their forage habitat and moved by a current of pond water focused toward a collection area as the collection device is moved in a forward direction through and with little effect to the pond vegetation; from the first collection zone the crustaceans are transported by fluid flow, air assistance, or conveyor to a point above the water level for final capture and further processing.

2. General Background

Within the expanding quaculture industry, there are several species of edible freshwater crustacea, commonly known as crustaceans. The main crustaceans harvested in Louisiana are members of the genus designated as Procambarus. As an established, renewable industry in Louisiana and rapidly expanding to other states as well as foreign countries, crustacean farming provides a source of food which in the southern United States is usually referred to as "crawfish", "crayfish", or "crawdads". Due to the popularity of crustaceans in France and as a result of the Acadian or Cajun influence in Louisiana, the French term "ecrevisse" also denotes this animal.

Crustaceans are consumed in large quantities during a typical crustacean season. Along the Gulf Coast, many seafood restaurants feature crustaceans as a specialty preparing them in a variety of ways. In areas where crustaceans are raised in abundance, large processing plants handle thousands of pounds of crustaceans daily. Louisiana alone produces up to 70 million dollars worth of crustaceans annually and has expanded acreage for crustacean culture every year since 1960 to 1985 where there is approximately 125,000 acres in production, with anticipated growth in the coming years expected to reach an excess of 400,000 acres.

The expansion of crustacean markets in production has brought into sharp focus some significant problems facing this industry. One of the major problems which each crustacean farmer must address is finding an economic and reliable means of harvesting a crop of crustaceans. In many cases, the cost of harvesting crustaceans approaches or exceeds 50% of their market price. The use of bait as an attractant in conjunction with some sort of net or trap has been and remains the primary method of harvesting crustaceans.

The simple method of catching crustaceans with a piece of bait tied to a string is often used by children in roadside ditches. Recreational crawfishing by adults most frequently employs baited liftnets. The vast majority of the commercial crustacean catch is harvested using baited wire mesh traps having funnels. Such traps allow crustaceans to easily enter attracted by the bait, but makes it difficult for them to find their way out of the trap. However, initial investment for traps will reach or exceed $100.00 to $200.00 an acre. Recurring cost for traps would also include repair, replacement, handling and storage on an annual basis.

In order for crustacean ponds to be considered productive, intensive and continuous harvesting must take place so as to remove crustaceans as soon they become market size and thereby making the limited space and food supply available for use by smaller and immature crustaceans. Current recommendations call for daily harvest using 30 to 40 traps per acre in commercial crustacean ponds. Fishing crustacean ponds in this manner produces a maximum yield yet cost for buying storage and handling bait becomes critical. It is not uncommon for a 100 acre crustacean farm to incur expenses relating to bait to be in excess of $20,000 during a single season.

Not only is crustacean bait expensive, it makes for additional labor considerations and involves the task of handling bait which is messy and which often has a strong unpleasant odor. The use of bait for the purpose of harvesting crustaceans, although a primitive and expensive procedure, has yet to be replaced by alternative methods.

Recognizing a bottle neck in the culture of the crustaceans, much research by universities and many individuals has been conducted towards finding an improved method designed to harvest crustaceans. Some of the alternative approaches to the traditional "baited" trap include electric harvesters which shock crustaceans to the surface and allows a scooping device to catch them as a harvester moves through a pond; the use of water current over spillways which takes advantage of behavioral tendencies for crustaceans to exit ponds according to directional flow; traditional and modified seines and trawls; the use of vibrations to attract or repel crustaceans; and finally chemical attractants.

Additional research has been attempted to improve traditional baited trap use and design. Research for improving the efficiency of baited traps has included the development of an irrigation type harvester which moves slowly back and forth across the pond, setting and emptying traps as it goes. Research and development of artificial bait has become influential and widely used among crustacean farmers, but natural bait and cut fish continues to be used in large quantities. However, the disadvantage of using bait to entice crustaceans into a trap or the like extends far beyond the cost of the bait itself. Bait subject to spoilage must be refrigerated and must be replaced in traps as it loses it freshness. Old bait mixed in with live crustaceans increases mortality and spoilage, appears unappetizing and must be removed before cooking or processing.

Therefore, it would be a vast improvement in the harvesting of crustaceans to introduce into the industry a system for harvesting crustacean which is baitless, and can be used over a very large acreage such as the ponds where the crustaceans are cultivated, whereby the crustaceans may be removed quite easily from the bottom of the pond, and collected in a collection zone on the vehicle for further processing.

Several patents have issued which address both the harvesting of crustaceans and the general area of harvesters themselves as applied to certain food stuffs. These patents are as follows:

| Patent No: | Inventor: | Title: |
|---|---|---|
| 4,563,830 | Cain, Jr., et al | "Process And Apparatus For Harvesting Soft Shell |

| Patent No: | Inventor: | Title: |
|---|---|---|
| | | Crayfish" |
| 4,551,938 | Sheldon, et al | "Retrieval Of Lobsters And Other Objects" |
| 814,762 | Yeager | "Pick Grading Machine" |
| 1,099,407 | Swayger | "Harvester" |
| 2,062,946 | Sorensen | "Washing And Grading Machine" |
| 2,292,068 | Grayson | "Apparatus For Size Grading Shrimp" |
| 3,750,233 | Lovett | "Shrimp Separating Methods" |
| 2,728,455 | Greiner | "Grading Machine For Shrimps" |
| 2,888,709 | Lapeyre | "Machine For Separating Shrimp From Fish And De-Heading The Shrimp" |
| 4,016,625 | Mitchell | "Apparatus For Sizing And Deheading Shrimp" |
| 3,799,336 | Holman | "Method And Apparatus For Treating Discrete Articles" |
| 3,784,007 | Skrmetta | "Dynamic Shrimp Grader And Grading Method" |
| 4,187,946 | Stevenson | "Worm Harvester" |
| 1,960,857 | Stoltenberg | "Potato Harvesting Apparatus" |

SUMMARY OF THE PRESENT INVENTION

The harvester of the present invention is an improvement over the current state of the art in the following manner. What is provided is a primary vessel, such as a flotable float or the like, having a crustacean retrieving means attached to the forward end of the vessel, with the vessel being motor driven, the motor driving a plurality of dasic wheels to maintain the vessels above the water, and allowing it to move on the bottom of the pond. The retrieving means includes a first primary roller positioned substantially the distance of the width of the vessel and moving along the bottom of the pond for disturbing the crustaceans as the vessel moves forward. There is provided a primary conveyor wall directly to the rear of the primary roller wherein the crustaceans moving over the roller are deposited on the conveyor which transports and grades the crustaceans, the larger crustaceans moving upward into a first receiving bin in the vessel, and the smaller ones returned to the pond. The primary conveyor includes a plurality of spaced apart shelf members along its width so that the crustaceans will be lodged against the shelf member and will be deposited into the receiving bin as the conveyor belt circulates. In the uppermost end of the conveyor belt, there is provided a grass catching means, which includes a tacky surface where upon the grass is lodged, and deposited back into the pond. To the rear of the deposit bin there is included a continuous conveyor for transporting the crustaceans from the deposit bin to the rear of the vessel wherein the crawfish are sorted and boxed.

The harvesting means also includes a pair of pontoon-type side walls extending forwardly of the conveyor, and constructed of a material to provide a buoyancy to the side walls as the vessel is moved forward. There may be further included air and water eductor means extending forward of the side walls of the conveyor, with water and air being educted into the pond ahead of the harvesting section, so that crustaceans are disturbed yet are trapped within the confines of the eductor means and the side walls of the conveyor so that the majority of the crustaceans in that portion of the pond are moved rearwardly towards the conveyor to be conveyed into the vessel. The system would allow the harvesting means to be hydraulically manipulated in various positions so that the vessel may operate in various depths of water.

Therefore, it is a principal object of the present invention to provide a crustacean harvesting system which provides the conveying of crustaceans from a pond bottom upwardly into a receiving bin and the simultaneously sorting out of the smaller crustaceans so that they may be returned to the pond.

It is a further object of the present invention to provide a crustacean harvester which is motorized and able to manipulate on the bottom of a pond, while harvesting crustaceans as the vessel moves along through the pond.

It is still a further object of the present invention to provide a crustacean harvesting system which would disturb crustaceans in advance of the harvester, yet maintain the crustaceans within a confined area until the crustaceans are deposited onto a conveyor and are moved rearwardly to be deposited, sorted, and packaged for marketing.

It is still a further object of the present invention to provide a harvesting system for crustaceans, which assure that the greater portion of the crustaceans entering the system will be captured, yet that other extraneous material, such as grass or the like, will be redeposited back into the pond.

These and other objects of this invention will be readily apparent to those skilled in the art from the detailed description and claims which follow.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 is an overall top view of the preferred embodiment of the system of the present invention;

FIG. 2A is an overall side view of the preferred embodiment of the system of the present invention;

FIG. 2B is a partial view of the conveyor of the present invention;

FIG. 3 is a view along lines 3—3 in FIG. 2A of the pontoon internal construction in the preferred embodiment of the system of the present invention;

FIG. 4 is a partial perspective view of the conveyor system of the present invention including the air and water eductor;

FIG. 5 is a cross-sectional view along lines 5—5 in FIG. 4 of the air and water eductor tube in the system of the present invention;

FIG. 6 is a partial view of the primary conveyor in the system of the present invention.

DETAILED DESCRIPTION OF THE PREFERRED EMBODIMENT

Figure 7:
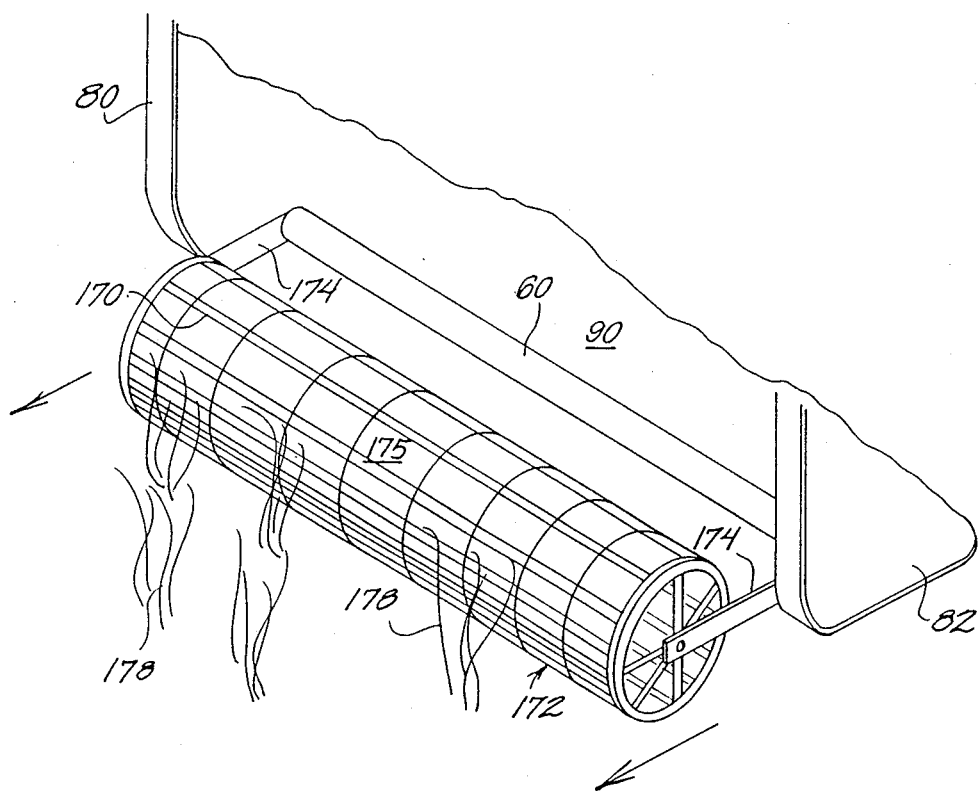
FIG. 7 is a partial view of a secondary roller utilized in an alternative embodiment of the present invention.

As seen in the Figures, particularly in overall views in FIGS. 1 and 2A, the system of the present invention is illustrated by the numeral 10. Apparatus 10 includes a primary vessel 12 which in the particular embodiment, may be a simple flat boat or the like having a pair of side walls 14, 16, and a rear wall 18, and a front wall 20 having a top, including a floor portion 22, all defining a receiving vessel for the harvested crustaceans. As seen in the Figures, primary vessel 12 would be modified to include a plurality of wheels 24, one at substantially each corner of the boat, with each wheel 24 being of the type of a "dasic wheel", having a plurality of cleats 26 (see FIG. 2A), along the side walls 27 of each wheel, the cleats members 26 providing traction as the wheels 24 sink into a bottom 28 of a pond 30 as seen in FIG. 2A. For purposes of operation, the vessel 12 would be operated by a diesel or gas motor 32, as seen in FIG. 2A, providing driven power to the rear wheels 24 so that the vessel 12 is moved forward during operation in the direction of Arrow 34, and provides power to the hydraulics of the system. As seen in FIG. 1, the vessel 12 would also include a drivers portion 36 so that an individual may drive and steer the vessel as the vessel is in use.

For purposes of adequate description, the system of the present invention can be divided into the vessel 12 wherein crustaceans are harvested and deposited in the vessel, and the means by which the system is powered and steered. The second portion of the system includes a harvesting means 40 which is illustrated in top view in FIG. 1, and which will be the principal portion of the present invention. As seen in the Figures, harvesting section 40 would be attached to the front wall 20 of vessel 12, so that a rear portion 42 of harvester 40 would lie adjacent the front wall 20 of vessel 12, in order to retrieve the crustaceans being harvested. Harvesting means 40 is further secured to vessel 12 via a system of hydraulic cylinders 44 (FIG. 2A) in order to manipulate the harvesting means 40 during operation.

Turning now to the construction of the harvesting means, harvesting means 40 would include a primary conveyor belt 46 circulating between rolls 45 and 47 which belt 46, would include a continuous wire floor portion 48, the upper surface of which would move in the direction of Arrow 50, so that the crustaceans would be conveyed from the bottom 28 to the surface of pond 30 onto a forward portion 52 of belt 46, conveyed upwardly in a direction of Arrow 50 to the rear portion 54 of belt 46, and deposited into a receiving bin 56. Conveyor belt 46 again would be constructed of a wire mesh material, the size of the mesh being adequate to maintain the larger crustaceans onto the floor of the belt as they are conveyed upwardly, yet the smaller crustaceans would fall through the openings in the mesh, and be returned to the pond. Therefore, primary conveyor belt 46 serves as an automatic sorting means, and the crustaceans are being moved upward into the receiving bin 56. For purposes of operation, conveyor belt 46 would be automatically operated via the hydraulic system of the vessel and may be operated at speeds which are variable, depending on the nature of harvest at a particular time.

Further, as illustrated in FIG. 2A, the system would include a secondary conveyor means 59, extending rearwardly from the receiving bin 56, which would convey the crustaceans from the receiving bin 56 into a final collection box 61 so that the crustaceans may be sorted and packaged. The conveyor belt 59 would likewise be operated as part of the overall system, and would serve to move the crustaceans that have been received in bin 56 during harvesting.

As seen in the Figures, the harvesting means 40 further includes a primary forward roller 60, which is substantially of equal width of belt 46, and moves along the bottom 28 of pond 30, in order to disturb the crustaceans on the bottom of the pond as the system moves forward. It is seen that the crustaceans will in effect, move over roller 60 and be deposited onto conveyor 46 and be conveyed upwardly into receiving bin 56 as illustrated in FIGS. 2A and 2B.

An additional novel feature of conveyor 46 is a means whereby the crustaceans are maintained on the conveyor surface as belt 46 moves upwardly to be deposited into receiving bin 56.

As seen in FIG. 2B in isolated view and in FIG. 6, there is illustrated in partial view a portion of belt 46 moving around an upward roller 45 in the direction of Arrow 50. There is illustrated a plurality of spaced apart members 62, each of which would comprise a length of angled material, such as "angle iron" hingedly secured along the entire width of belt 46, and each comprising an upright wall portion 64 and a floor portion 68, hinged to floor 46 via hinges 49. During operation, a crustacean would be lodged against upright wall 64, yet would be resting on floor portion 68 as the conveyor belt 46 moves upwardly. Upright portion 64 prevents the crustaceans from tumbling down the belt 46 and possibly escaping. The floor portion 68 prevents the crustaceans from grabbing hold of the wire floor portion 48 of belt 46, with their claws, or wrapping their tail around the wires of wire floor portion 48, as the belt 46 moves forward. Therefore, the crustacean 66 is secured "helplessly" onto the angle iron 62 and as seen in FIG. 2B, as that portion of the belt begins its traverse around roller 45, the angle iron, being attached to the belt 46 by hinges 49, is slipped upward and outward, and the crustacean 66 is flung off the belt outwardly in the direction of Arrow 69, and into receiving bin 56. Therefore, it is virtually assured that any crustacean which is lodged against each member 62 will additionally be flung off the belt into the receiving bin 56 and will not have the opportunity to adhere itself to the surface of belt 46.

One of the concerns in the harvesting of crustaceans out of a grass pond is the amount of grass that is deposited onto belt 46 together with the crustaceans as the apparatus moves forward in the water. Therefore, there is included a means in the system for eliminating most if not all of the grass from the conveyor as the conveyor belt 46 is traversed around upper roller 45. As seen in FIG. 4, this means would include a powered roller 70, positioned directly beneath and slightly to the rear of upper roller 45, with powered roller 70 having a surface 72 along its circumference, constructed of the heavy material such as outdoor carpet material, or "VELCRO", which would gather any grass moving along conveyor belt 46 as conveyor belt 46 moved around roller 45, so that the grass would be deposited onto surface 72 of roller 70, and as that surface reached a bottom most point 73 of its travel, the grass, through gravity, would fall into the pond 30. Therefore, powered roller 70 would remove most of the grass off of conveyor 46 during the harvesting process. Whatever grass would not be removed by powered roller 70 may be deposited into receiving bin 56. It is foreseen that bin 56 could contain a quantity of water 57, so that the grass would float upward onto the surface of the water and be retrieved from the surface of the water and returned into the pond.

An additional structure which is vital to the operation of the present invention is a means by which the crustaceans are maintained within a confined area as the crustaceans move over roller 60 and upward onto conveyor belt 46. This means comprises a pair of pontoon members 80 and 82, which are attached to the front of vessel 12 by an arm member 81 extending out from vessel 12 and attached via hydraulic cylinder 44. Each arm 81 integrally expands into a principal body portion 84. Body portion 84 has a lower sloping edge 87 which slopes into a horizontal base edge 86, that slides along the bottom of the pond as the vessel 12 moves forward. Each pontoon 80 and 82 would also include a forwardmost sloping edge 87 for allowing easy maneuvering over the bottom of the pond, and with a top edge 88, which is substantially the same height as the top portion of the vessel 12.

As seen in FIG. 2A, the forward body portion 84 of pontoons 80 and 82 therefore provides a substantially forward rectangular pair of wall portions 89, to serve as a means for confining the crustaceans in an area 90 between the pontoons 80 and 82 as seen in FIG. 1. As seen in FIG. 3 in cross-section, in order to provide a certain buoyancy to each of pontoons 80 and 82, each pontoon 80 and 82 is provided with an outer metal wall 83, which serves as a skin for pontoons 80 and 82, wherein there is provided a lightweight buoyant material 85 such as polyurethane within the confines of skin 83, in order to provide buoyancy to each of pontoons 80 and 82, and allow easier maneuverability through the water of the pond.

In order to further provide means for luring the crustaceans into the confined area 90 between pontoons 80 and 82, reference is made to FIG. 4. In FIG. 4 there is illustrated an eductor system 100 in the present invention. Eductor system 100 includes a first pair of horizontal pipes 102 extending from vessel 12, each pipe 102 serving as a means for conveying a mixture of educted air and water through pipe 102 forwardly of each pontoon 80 and 82. As seen in the Figures, each pipe 102 is secured onto each pontoon 80 and 82 via brackets 103 and an upper frame 104 for maintaining pipe 102 in the horizontal position as it extends that distance beyond the outermost edge of each pontoon 80 and 82. As seen in the Figure, as pipe 102 reaches its furthest point 106, it turns downwardly into an arcuate portion 108 and turns rearwardly along a second horizontal portion 110 having a rearward end 112 substantially equal at a point approximate the forwardmost portion of each pontoon 80 and 82. Air and water are educted through pipe 102 in the direction of Arrows 114 during use. Along the second lower horizontal portion of pipe 110, which would reside at a level substantially along the bottom of the pond, there is provided a plurality of ports 116, which are more clearly illustrated in FIG. 5. As seen in the Figure, each eductor pipe 102 has a plurality of ports 116 provided along its uppermost wall 117 and a plurality of spaced apart ports 116 directed inwardly into a space 120 which is that space intermediate the pair of eductor pipes 102. Therefore, air and water being educted through the pipe 102 are forced out of upper ports 116 to form a type of air barrier between the lowermost horizontal portion 110 of eductor pipe 102 and the upper most expanse of pipe 102. Likewise, the inwardly depending ports 116 would thrust air and water inwardly into space 120 and serve as a means for arousing any crustaceans contained in space 120 which would tend to have them travel rearwardly into collection space 90, between each pontoon 80 and 82, then over roller 60, and onto conveyor 46.

Therefore, in addition to the use of the pair of pontoons 80 and 82 serving as a confined area for moving the crustaceans onto conveyor 46, there may be provided an additional conveyor system ahead of pontoons 80 and 82 wherein the upwardly thrusted water and air forms a "wall" along each eductor pipe, and the inward thrust of water through ports 116 provides a means for arousing the crustaceans and having them move vigorously rearward to be captured onto conveyor 46.

For purposes of construction, each eductor arm 102 is hingedly secured onto the vessel 12 and manipulated via hydraulic cylinders 130, so as to allow them to be removed quite easily when not in use, and be positioned away from the principal system. However, when necessary, the two arms 102 may be simply engaged in position as seen in FIG. 4 and placed in operation if the need arises.

An additional option in the present system would be a means for moving through the type of grass known as "alligator" grass as the apparatus moves forward through the water. As seen in FIG. 7, this option would include a free roller 172 which would be constructed of a wire mesh material 170 which would push down the alligator grass vines and yet may arouse the crustaceans as it moves through the water. Preferably the larger roller 172 would be attached via a pair of arm members 174 onto the forwardmost end of each of pontoons 80 and 82, and would be constructed of spaced apart wire members so that the volume of water and crustaceans may move through the opening 175 in roller 172 and into space 90 for then being deposited onto conveyor 46. For purposes of use, the single use of roller 172 would be as an optional feature when one is operating in long alligator grass 178, and the alligator grass must be laid down in advance of the system, so as to eliminate or reduce the possibility of the alligator grass being deposited onto the conveyor and provide great difficulty in removing the grass from the conveyor.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for harvesting crustaceans out of a flooded area, the system comprising:
   (a) a vessel movable through the water, the vessel having a forward portion;
   (b) a primary roller attached to the forward portion;
   (c) a first primary conveyor secured to the forward portion of the vessel behind the primary roler, so that crustaceans are moved rearwardly from the primary roller and deposited onto the conveyor as the vessel moves forward;
   (d) means on the conveyor for maintaining the crustaceans on the surface of the conveyor as the conveyor moves rearwardly;
   (e) means forward of said primary roller for educting water and air for disturbing the crustaceans in advance of the vessel, yet maintaining the crustaceans in the area substantially defined by the space between said educting means;
   (f) receiving means in the vessel for receiving the crustaceans as the crustaceans are removed from the conveyor; and (g) means for separating grass collected by the conveyor from the crustaceans and returning the grass to the flooded area, the separating and returning means positioned between the primary conveyor and the receiving means.

2. The system in claim 1, wherein the vessel is a flat boat or the like vehicle.

3. The system in claim 1, wherein the vessel is propelled through the water through a plurality of powered wheels.

4. The system in claim 1, further including a pair of buoyant pontoon members positioned on either side of the conveyor defining a space therebetween and serving as the means for maintaining the crustaceans on the conveyor as the crustaceans are conveyed into the vessel.

5. The system of claim 1, wherein the first primary conveyor and the means for maintaining the crustaceans on the conveyor includes:

an upper roller and a lower roller;

a continuous belt having a wire floor dimensioned so that small crustaceans are returned therethrough to the flooded area, the continuous belt turning about the upper and lower rollers;

angular members hingedly attached at intervals to the wire floor and against which crustaceans that have not returned to the flooded area lodge as the primary conveyor moves upwardly, the angular members having an upright portion preventing crustaceans from tumbing down the primary conveyor, the angular members having a floor portion so that crustaceans are prevented from grabbing hold of the wire floor, the angular members flinging the crustaceans from the primary conveyor to the receiving means as the primary as the primary conveyor turns on the upper roller.

6. The system of claim 5, wherein the receiving means further includes a receiving bin for receiving the crustaceans flung from the angular members.

7. A system for harvesting crustaceans from a pond having a bottom, the system comprising:
 a. a powered vessel moving along the bottom of the pond, the vessel having a front portion defined by a wall having a top;
 b. a harvesting means, secured to the front portion of the vessel, the harvesting means further comprising;
  i. a primary conveyor, having a lowermost end which moves along the bottom of the pond, and an uppermost end positioned at the top of the front wall of the vessel;
  ii. means for moving the primary conveyor at a variable speed, and for conveying the crustaceans from the water onto the conveyor and upwardly to be retrieved in the vessel;
  iii. a pair of substantially buoyant pontoon members positioned on either side of the conveyor, for defining a collection zone at the lowermost end of the primary conveyor as the vessel moves forward in the water;
  iv. eductor means, further comprising a pair of pipe members extending outwardly forward of the pontoon members, and substantially onto the surface of the pond, for educting air and water into the pond in such a direction so as to form a confined space between and ahead of the conveyor, and for arousing the crustaceans to move into the confined space for depositing onto the conveyor; and
  v. means on the surface of the conveyor for maintaining the crustaceans onto the conveyor belt surface, and for depositing the crustaceans in a receiving bin in the vessel.

8. The system in claim 7, further including means on the conveyor surface for grading the crustaceans as the crustaceans are moved upward on the conveyor belt, so that the smaller crustaceans are returned to the pond and are not deposited in the receiving bin.

9. The system in claim 7, further including means for preventing the crustaceans from adhering to the surface of the conveyor, the means further comprising a plurality of spaced apart angular members hingedly secured to the floor of the conveyor, to which the crustaceans rest during movement of the conveyor, so that when the angular members reach the top of the conveyor, the angular acceleration of the surface of the conveyor flips the angular member, causing a tangetial force on the crustaceans for propelling them off of the conveyor and into the vessel.

10. The system in claim 8, further including means for preventing the crustaceans from adhering to the surface of the conveyor, the means further comprising a plurality of spaced apart angular members hingedly secured to the floor of the conveyor, to which the crustaceans rest during movement of the conveyor, so that when the angular members reach the top of the conveyor, the angular acceleration of the surface of the conveyor flips the angular member, causing a tangential force on the crustaceans for propelling them off of the conveyor and into the vessel.

11. The system of claim 7, further comprising a means for separating weeds from crustaceans and returning the weeds to the pond, the separating and returning means positioned adjacent the uppermost end of the primary conveyor and before the receiving bin.

12. The system of claim 8, further comprising a means for separating weeds from crustaceans and returning the weeds to the pond, the separating and returning means positioned adjacent the uppermost end of the primary conveyor and before the receiving bin.

13. The system of claim 9, further comprising a means for separating weeds from crustaceans and returning the weeds to the pond, the separating and returning means positioned adjacent the uppermost end of the primary conveyor and before the receiving bin.

14. The system of claim 8 further comprising a wire mesh roller attached to said pontoon members for pushing down any grass vines as said system moves through the pond.

15. The system of claim 9 further comprising a wire mesh roller attached to said pontoon members for pushing down any grass vines as said system moves through the pond.

* * * * *